ERROR CORRECTION IN SEQUENTIAL CODE PULSE TRANSMISSION

Filed Feb. 19, 1951 4 Sheets-Sheet 1

INVENTOR
W. R. BENNETT
BY Harry C. Hart
ATTORNEY

May 13, 1952 W. R. BENNETT 2,596,199

ERROR CORRECTION IN SEQUENTIAL CODE PULSE TRANSMISSION

Filed Feb. 19, 1951 4 Sheets-Sheet 2

INVENTOR
W. R. BENNETT
BY Harry C. Hart
ATTORNEY

May 13, 1952 W. R. BENNETT 2,596,199

ERROR CORRECTION IN SEQUENTIAL CODE PULSE TRANSMISSION

Filed Feb. 19, 1951 4 Sheets-Sheet 3

INVENTOR
W. R. BENNETT
BY Harry C. Hart
ATTORNEY

ERROR CORRECTION IN SEQUENTIAL CODE PULSE TRANSMISSION

Filed Feb. 19, 1951

4 Sheets-Sheet 4

INVENTOR
W. R. BENNETT
BY Harry C. Hart
ATTORNEY

Patented May 13, 1952

2,596,199

UNITED STATES PATENT OFFICE 2,596,199

ERROR CORRECTION IN SEQUENTIAL CODE PULSE TRANSMISSION

William R. Bennett, Summit, N. J., assignor to Bell Telephone Laboratories, Incorporated, New York, N. Y., a corporation of New York Application February 19, 1951, Serial No. 211,725

6 Claims. (Cl. 178—17)

This invention relates to pulse code systems in which information is transmitted in the form of successive code groups of pulses, the pulses within each group following each other in time and the groups likewise following each other in time. It has for its principal object the correction, at the receiver station or at an intermediate relay station, of errors which may have crept into the code pulse sequence in the course of transmission.

It is well known that when information is to be transmitted by way of a group of $m$ pulses, an error in one of these pulses can be detected, though not located, by the employment of an additional $(m+1)^{th}$ checking pulse. This pulse is attached to each group of $m$ pulses, and its value is determined exclusively by the values of the $m$ information pulses: for example, it is an "on" pulse or an "off" pulse accordingly as the total number of information "on" pulses is odd or even. When it is thus determined, the total number of "on" pulses of the whole group including the check pulse is necessarily always even in the absence of errors. Therefore, a parity check may be performed at a receiver station, each incoming group being examined for its oddness or evenness; and whenever a pulse group is encountered in which the number of "on" pulses is an odd number, the operator may be signalled or the operation halted. Obviously, an odd parity check can serve as well as an even one.

In United States Patent 2,552,629, issued May 15, 1951, on an application of R. W. Hamming and B. D. Holbrook, Serial No. 138,016, filed January 11, 1950, a system is described in which parity checks are employed not only to mark the presence of an error but to localize it and correct it as well. The principles on which any such error-correcting system are based are also set forth by R. W. Hamming in the Bell Laboratories Record for May 1950 (vol. 28), page 193. These principles may be briefly summarized as follows: Just as a single parity check performed on a group of $m$ information digits plus a single check digit (the word "digit" is employed as the mathematical counterpart of the "code element" with which physical apparatus or methods must deal) can reveal the presence of an error somewhere in the group, so a group of $k$ parity checks performed on a group of $n=m+k$ digits can indicate any of $2^k$ values and can therefore reveal the presence of any one of $2^k$ distinct errors. If, then, $k$ is selected to satisfy the requirement $$2^k \geqq m+k+1$$

an error in any one of the $n=m+k$ pulse positions of the group can be indicated, and one further condition, signifying no error, can be indicated as well. In the group of $n=m+k$ digits, only $m$ of them carry original information, the remaining $k$ digits being included solely for error-correction purposes.

Evidently, every group of $m$ information digits must differ from every other such group in the value or signalling condition of at least one digit, else the code would be ambiguous. By the addition, to each such group, of a sufficient number $k$ of check digits, it is possible so to arrange the values among them that every group of $n$ information-plus-check digits differs from every other such group in the value or signalling condition of at least three digits. When a single error occurs in such a group, the resulting incorrect group differs from the correct one in exactly one digit and from the most nearly similar one of the remaining groups in two digits; i. e., it resembles the correct group more closely than it resembles any of the others. Ultimately, it is this difference of resemblances which is turned to account in the location of the error.

In pulse transmission apparatus, this means that with every group of $m$ information pulses, $k$ checking pulses must be transmitted. This naturally makes for redundancy, and this redundancy is the price which is paid for error-free transmission.

The apparatus described in the Hamming-Holbrook patent comprises electromechanical relays which are restricted in their operation to comparatively low frequencies and are interconnected in circuits which are adapted to multiple-line simultaneous puse transmission. The present invention provides apparatus which is not subject to these restrictions. Accordingly, it is a specific object of the invention to extend the error-correction principles of the Hamming-Holbrook patent to the field of high frequency sequential pulse transmission.

The invention will be fully apprehended from the following description of one embodiment in which, by way of illustration, successive code groups of 10($n$) sequential pulses are generated at high speed, of which 6($m$) are information pulses and 4($k$) are checking pulses. These pulse sequences are transmitted to a receiver station where the necessary parity checks are performed with the result that errors which may have crept into the pulse sequences in the course of transmission are exactly located. These errors are then corrected prior to decoding the information pulses.

Figure 1:
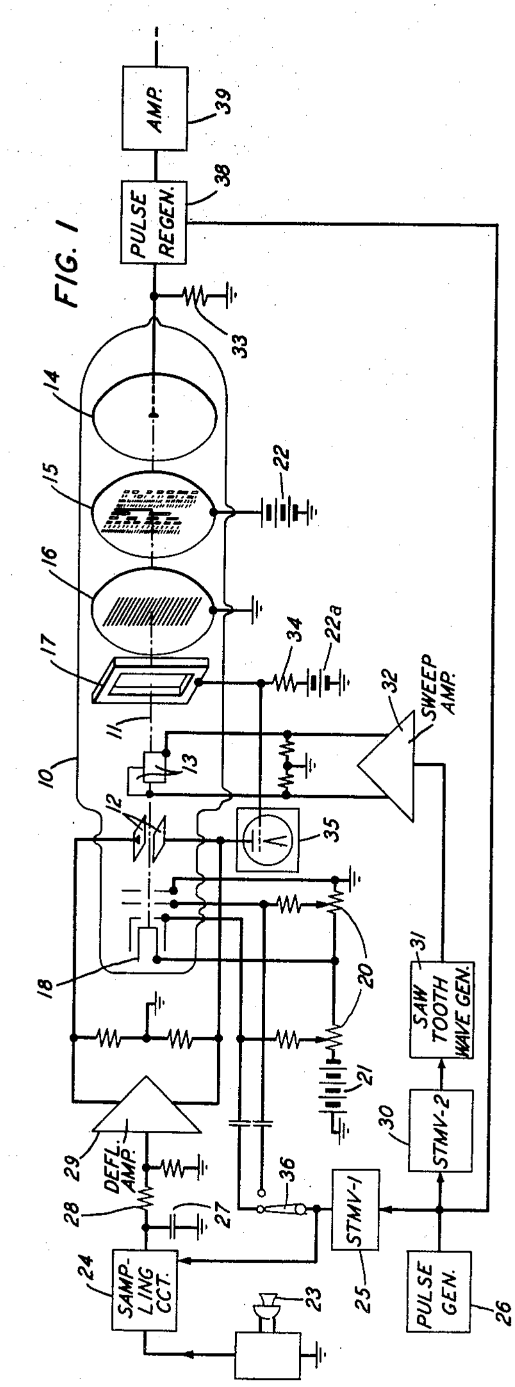
Fig. 1 is a schematic diagram of coding apparatus in accordance with the invention.

Referring now to the drawings, Fig. 1 shows a coder device for translating a voice wave or other message signal into an error-correcting sequence of binary code pulses. The basic features of the apparatus, which are described in the Bell System Technical Journal for January 1948 (vol. 28), pages 1 and 44, comprise a cathode beam tube 10 including an electron gun for projecting a cathode beam 11, vertical deflection plates 12, horizontal deflection plates 13, a collector anode 14, a coding mask 15, a quantizing grid 16, and a secondary electron collector 17. The electron gun may comprise a cathode 18, a control electrode or grid, and focussing and accelerating electrodes which may be supplied with operating potentials by connection to a voltage divider 20, energized by a source 21 in conventional fashion. The anode 14 and the grid 16 may be grounded. The mask 15 is maintained at an elevated potential and the collector 17 at an intermediate potential by sources 22, 22*a*.

In operation, a signal to be encoded, for example, a voice message originating at the source 23, is repeatedly sampled by a sampling circuit 24 under control of a single trip multivibrator 25 which delivers short square pulses at the sampling frequency. The latter is in turn controlled by a basic timing circuit or pulse frequency generator 26. Each speech sample is stored on a storage condenser 27 for use in the coding device until the arrival of a new sample. The resulting condenser voltage is applied by way of a voltage divider 28 to a vertical deflection amplifier 29 whose output is applied to the vertical deflection plates 12. The pulse generator 26 also controls a second single trip multivibrator 30 delivering square pulses of greater duration than those of the first single trip multivibrator 25. These control a saw-tooth wave generator 31 delivering its voltage to a sweep amplifier 32 whose output is applied to the horizontal deflection plates 13. Thus, after vertical deflection of the cathode beam 11 to a desired position at the starting end of a particular aperture row of the coding mask 15 by the signal, the beam 11 is swept in a horizontal direction along this aperture row to deliver a sequence of current pulses at the collector 14 and, therefore, of voltage pulses across the output loading resistor 33. By proper arrangement of the apertures of the coding mask 15, these pulses constitute a conventional binary code group of a number of digits or pulse positions equal to the number of columns of apertures in the mask. The present invention is illustrated in terms of a 6-digit binary code produced by a mask having six columns of information apertures in $2^6$ or 64 rows, which gives fair fidelity in reproduction. The wires of the grid 16 are parallel with the aperture rows of the mask 15, and the spaces between them are aligned with these apertures. Any tendency of the beam 11 to drift off the aperture row along which is sweeps results in impact of the beam on one or other of the grid wires. Secondary electrons ejected from this wire are collected by the collector 17 to form a current through the resistor 34. The voltage drop across this resistor is inverted in phase by an amplifier 35 and applied to the vertical deflection plates 12 in such phase as to nullify the drift. This quantizing grid is the subject of Sears Patent 2,458,652. The beam 11 may be blanked or defocussed during the return sweep by application of pulses from the multivibrator 25 to the accelerating or focussing electrode, selection being made by a switch 36, as more fully explained in Meacham Patent 2,537,843.

Figure 2:
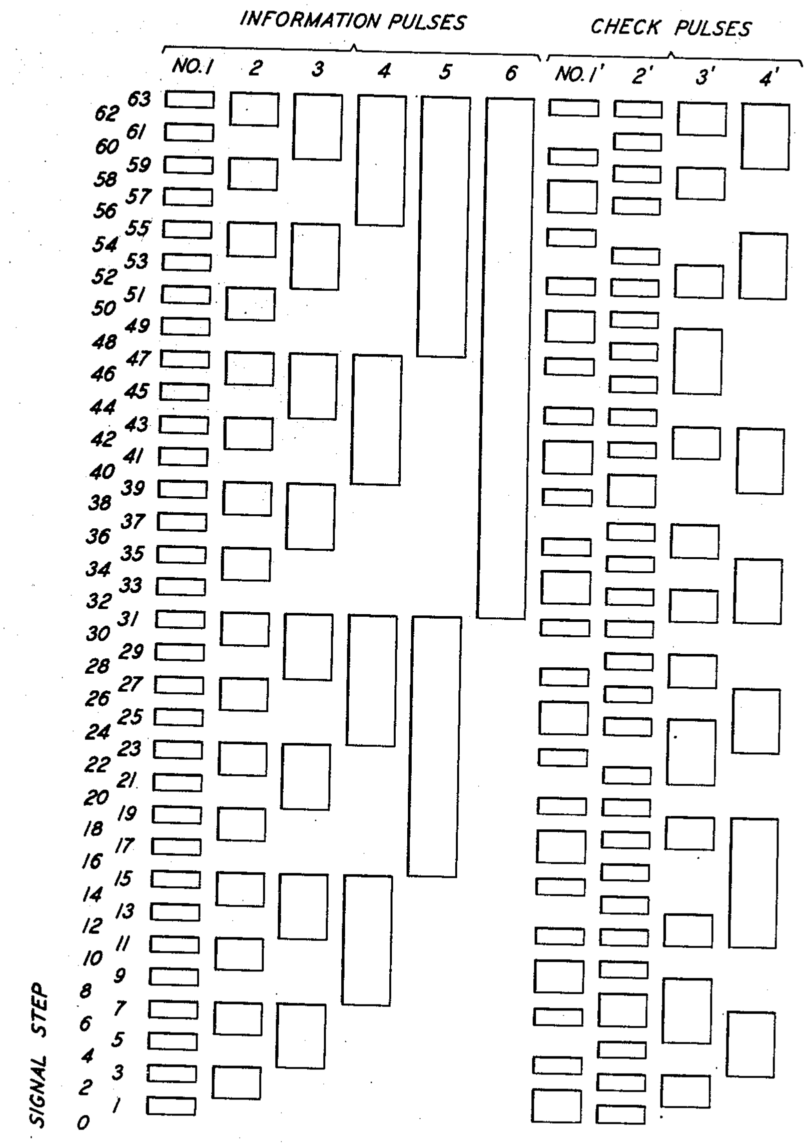
Fig. 2 is an end view of the coding mask of Fig. 1 drawn to an enlarged scale.

Fig. 2 shows an end view of a coding mask which has been modified as compared with a mask for producing conventional binary code pulse sequences, as described in the Bell System Technical Journal publications above referred to, by the addition of apertures for producing check pulses. As illustrated, the mask has ten aperture columns; and, therefore, each sweep of the cathode beam across it generates a group of ten sequential pulses, of which the first six, numbered 1, 2, 3, 4, 5, 6, are the $m$ information pulses, while the last four, numbered 1′, 2′, 3′, 4′, are the $k$ checking pulses. The mask is arranged for even parity checks; that is to say, a parity check carried out over each of the parity subsequences described below and showing that that subsequence contains an even number of pulses means that there is no error in any of the pulses of that subsequence. The mask could as well be constructed for odd parity checks or for a mixture of even ones with odd ones. Construction of the mask for parity checks which are all alike in character, however, makes for simplicity of explanation. So, too, does arrangement of the apertures of the $m$ information columns in accordance with the conventional binary code, though any other two-valued code would do as well.

For the sake of definiteness, the term "virtual aperture" is employed in the following description to denote the point of intersection, on the mask of Fig. 2, of any of the $n$ columns with any of the $2^m$ rows. Because the mask forms a rectangular array of such virtual apertures, there are, in all, $n \cdot 2^m$ of them. It will be observed that each complete group of the virtual apertures of any one full row, taken over all ten columns, differs from every other such group in at least three real apertures. This distribution of the real apertures among the totality of virtual apertures is the subject of the invention in one of its aspects.

The virtual apertures of any row of the mask of Fig. 2 may be regarded as being broken down into the following subgroups:

*Table I*

| Parity Subgroup No. | Virtual Aperture or Pulse Position No. |
|---|---|
| A | 1, 2, 3, 1′ |
| B | 1, 4, 5, 2′ |
| C | 2, 4, 6, 3′ |
| D | 3, 5, 6, 4′ |

Examination of this table shows that:

(*a*) Each of the parity subgroups A, B, C, D contains one and only one of the check virtual apertures 1′, 2′, 3′, 4′ and that it is in each case a different one.

(b) Each of the information virtual apertures 1, 2, 3, 4, 5, 6 appears in exactly two of the subgroups A, B, C, D.

(c) The pair of subgroups in which one of the information virtual apertures appears is for each such information virtual aperture a different one.

By virtue of the arrangement of the real apertures of the mask of Fig. 2, sweep of the beam over every real aperture generates an "on" pulse on the outgoing line, while sweep of the beam over a virtual aperture which contains no real aperture generates an "off" pulse or blank pulse position. Therefore, the subgrouping of the virtual apertures as given in the foregoing table is exactly reproduced as a subgrouping of the pulse positions in the outgoing train.

Moreover, the rear apertures of the mask are so arranged among the virtual apertures that on any one of the $2^m$ aperture rows, the sum of the real apertures is an even number. So, too, in any of the resulting pulse sequences, the sum of the "on" pulses is even. This permits the carrying out of an even parity check over each of the several pulse subsequences at the receiver station or at an intermediate relay station. In other words, when a parity check carried out over any such subsequence reveals an odd number of pulses, this signifies that an error has crept into some one of the pulses of that subsequence. When like parity checks are carried out over all of the subsequences, such error can be exactly located and, therefore, cured. In particular, suppose that a parity check is carried out over subsequence A and reveals an odd number. This means that one of the pulse positions of which subsequence A is composed, namely 1, 2, 3, or 1′, is in error—i. e., it contains a pulse when it should not, or it contains no pulse when it should contain one. Suppose that parity checks over subsequences B, C, and D reveal even parity for all of these subsequences. On the assumption that we are dealing with not more than one error, this means that none of the pulses of these subsequences is in error, and thus pulses 1, 4, 5, 2′, 2, 4, 6, 3′, 3, 5, 6, 4′ are all correct. Since the only remaining pulse is 1′, the error indicated by failure of the even parity check over subsequence A has been located in pulse position 1′. Suppose, on the other hand, that the even parity check fails for subsequences A and B simultaneously, while those for subsequences C and D succeed. The failure in the case of subsequence A means that one of the pulses 1, 2, 3, or 1′, is in error, while the failure in the case of subsequence B means that one of the pulses 1, 4, 5, 2′ is in error. Still on the assumption that we are dealing with not more than one error, the pulse position which is common to these two subgroups is No. 1, so that the error has been located as being in the first pulse position. Continuing in the same manner leads to the following correlation between even parity check failures and pulse positions containing an error.

*Table II*

| Condition | Conclusion |
|---|---|
| All checks even | No error. |
| A, B checks odd, others even | Error in pulse position No. 1. |
| A, C checks odd, others even | Error in pulse position No. 2. |
| A, D checks odd, others even | Error in pulse position No. 3. |
| B, C checks odd, others even | Error in pulse position No. 4. |
| B, D checks odd, others even | Error in pulse position No. 5. |
| C, D checks odd, others even | Error in pulse position No. 6. |
| A checks odd, others even | Error in pulse position No. 1′. |
| B checks odd, others even | Error in pulse position No. 2′. |
| C checks odd, others even | Error in pulse position No. 3′. |
| D checks odd, others even | Error in pulse position No. 4′. |

In this table, no use is made of the following five conditions:

(1) Parity check on subsequence A even, all others odd.

(2) Parity check on subsequence B even, all others odd.

(3) Parity check on subsequence C even, all others odd.

(4) Parity check on subsequence D even, all others odd.

(5) Parity checks on all four subsequences odd.

The present example thus utilizes only single parity check failures and double parity check failures, omitting to make use of the triple ones and the quadruple ones. For a gain in simplicity of the required apparatus, it is thus somewhat extravagant with its possibilities. This can be seen more clearly from the following.

Writing 0 for an even result of a parity check and 1 for an odd one, and writing the results of the four parity checks in sequence and in all possible combinations gives rise to the following table of four-digit binary numbers, together with their significations:

*Table III*

| Binary Number— Subgroup | D | C | B | A | Means that all pulses are Correct except pulse No. |
|---|---|---|---|---|---|
| | 0 | 0 | 0 | 0 | |
| | 0 | 0 | 0 | 1 | 1′ |
| | 0 | 0 | 1 | 0 | 2′ |
| | 0 | 0 | 1 | 1 | 1 |
| | 0 | 1 | 0 | 0 | 3′ |
| | 0 | 1 | 0 | 1 | 2 |
| | 0 | 1 | 1 | 0 | 4 |
| | 0 | 1 | 1 | 1 | [1] 7 |
| | 1 | 0 | 0 | 0 | 4′ |
| | 1 | 0 | 0 | 1 | 3 |
| | 1 | 0 | 1 | 0 | 5 |
| | 1 | 0 | 1 | 1 | [1] 8 |
| | 1 | 1 | 0 | 0 | 6 |
| | 1 | 1 | 0 | 1 | [1] 9 |
| | 1 | 1 | 1 | 0 | [1] 10 |
| | 1 | 1 | 1 | 1 | [1] 11 |

[1] Not included in illustrative code.

This table shows first that the system is extravagant in that it necessarily provides for location of errors among the check pulses as well as among the information pulses, which is unnecessary at a receiver (though it is necessary at each repeater), and second, that the example chosen does not make full use of its possibilities because the four parity checks are capable of locating an error anywhere in a larger group of pulses than is in fact employed. To make the fullest use of four parity checks, there should in principle be fifteen pulses in each group, of which eleven can be information pulses. In such case, use should be made of the situations, numbered 7, 8, 9, 10, 11 in the preceding table, in which three or more of the parity checks fail. To make the fullest use of three parity checks, the group should contain seven pulses, of which four can be information pulses. To make the fullest use of five parity checks, the group should contain 31 pulses, of which 26 can be information pulses, and so on, in accordance with the rule stated above, that $$2^k \geqq n+1$$

where $n=m+k$. Evidently, the ratio of the number of information pulses to check pulses improves as the total number of pulses increases.

The pulse groups as thus generated may be trimmed by a timed regenerator 38 brought to a suitable multiple level by an amplifier 39 and then transmitted over any suitable communication channel to a receiver station. Regenerative pulse repeaters may, if desired, be inserted at intervals along this channel, and any of these repeaters may, if desired, contain error correction apparatus as described below.

Figure 3:
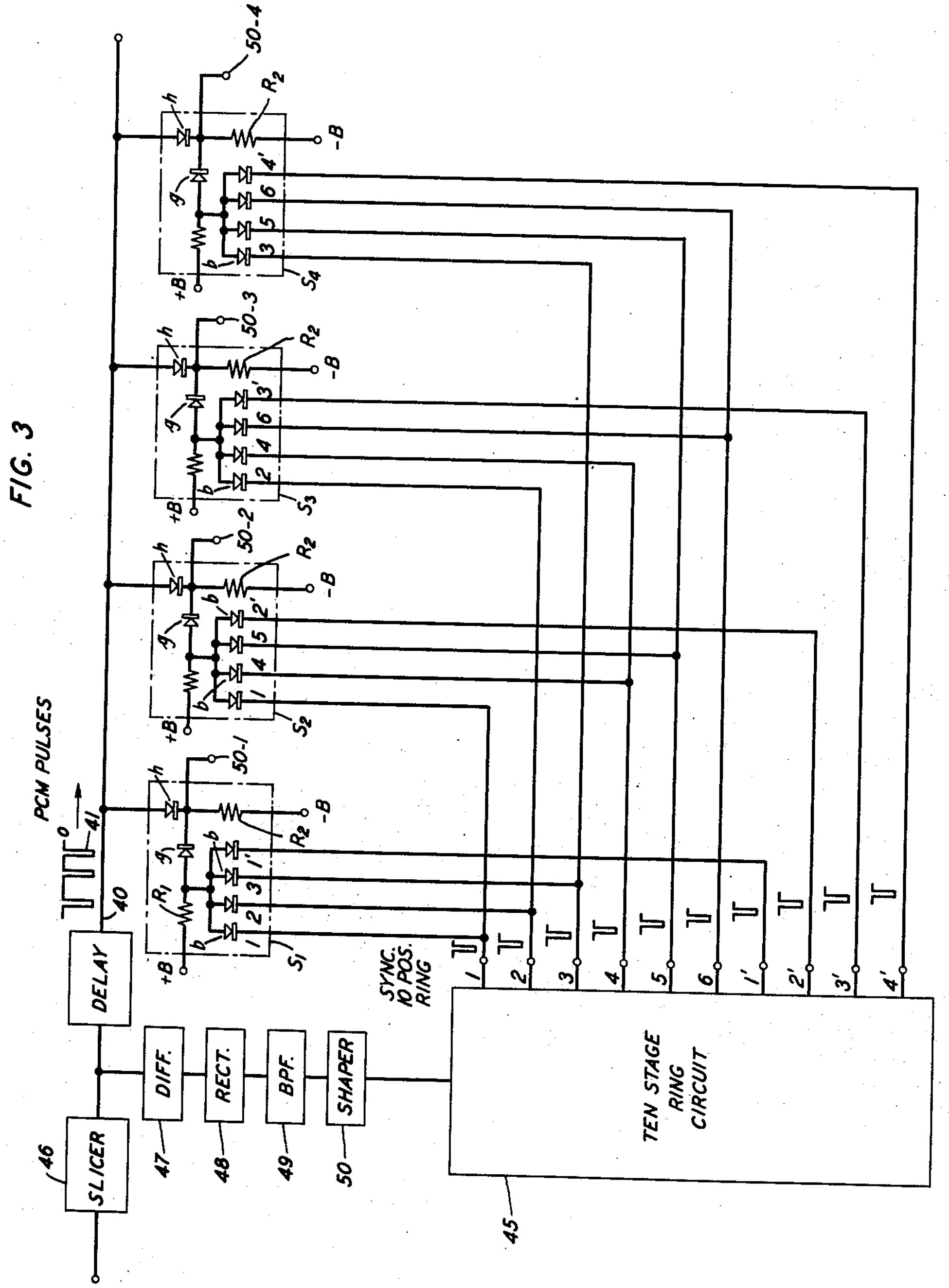
Fig. 3 is a schematic circuit diagram showing receiver or repeater station apparatus for picking parity subsequences of pulses out of an incoming pulse train.
Figures 4, 6:
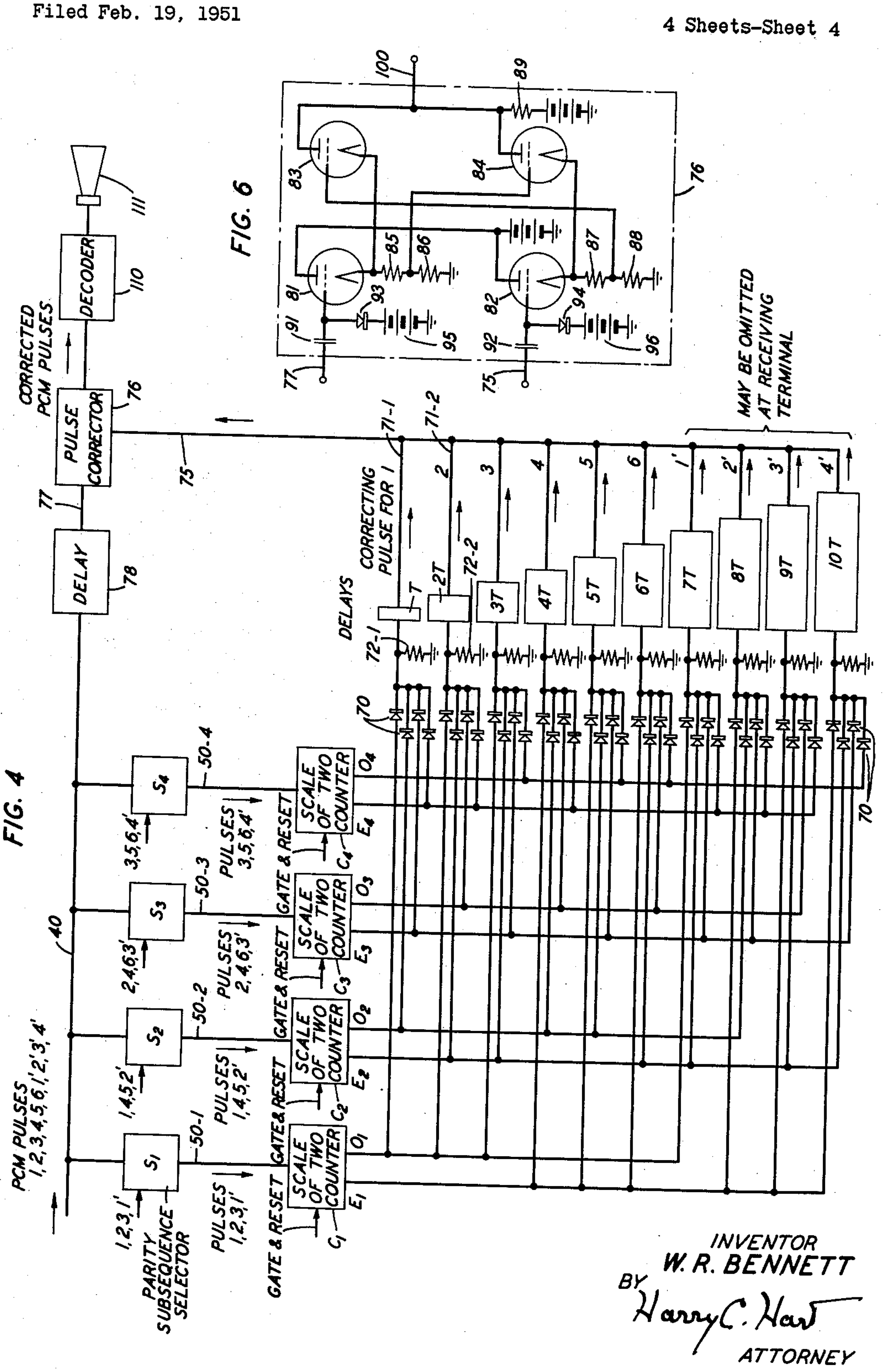
Fig. 4 is a schematic circuit diagram showing apparatus for performing parity checks on pulse subsequences and for delivering pulse correction signals accordingly.
Fig. 6 is a schematic circuit diagram showing circuit details of the digit corrector of Fig. 3.

The circuit details of apparatus for carrying out the pulse-correcting operations are illustrated in Figs. 3 and 4. Referring first to Fig. 3, the incoming pulse train may be a sequence 41 of pulses whose "off" value is zero potential on an incoming line 40 and whose "on" value is negative. It is applied to a group of parity subsequence selectors $S_1$, $S_2$, $S_3$, $S_4$, of which the first selects the subsequence A of Table I, the second B, the third C, and the fourth D. Each of these selectors may comprise a pair of diodes *g*, *h* with their cathodes connected together to one end of a resistor $R_2$ and to an output terminal 50, the other end of the resistor $R_2$ being connected to a point of fixed negative potential. The anode of the diode *h* is connected to the incoming line, and the anode of the diode *g* is connected to the anodes of all of a group of buffer diodes *b* whose cathodes are in turn connected to the similarly numbered output terminals of a suitable distributor such as a ten-stage ring circuit 45. These terminals are normally maintained at a small negative potential, e. g., one volt. Means including bias batteries, "D. C. restorers," ond the like, which are well known, operate in conjunction with blocking condensers, not shown, in series with the output terminals of the multivibrators of which the ring circuit is constructed to maintain these potentials at the desired values. The several output terminals deliver negative pulses of 10–20 volts in sequence and in the order in which they are numbered. The ring circuit distributor may be maintained in synchronism with the incoming pulse train by the application to it of suitable timing pulses. These may be derived from the incoming pulse train by the combination shown of a slicer 46, a differentiator 47, a rectifier 48, a narrow band-pass filter 49, and a shaper 50 connected in tandem in the order named. Such arrangements are well known, being fully described, for example, in Kreer-Peterson Patent 2,527,638, as well as elsewhere.

With this arrangement, application of the negative output pulse of any stage of the ring 45 to the cathode of one of the buffer diodes *b* drives it into its low resistance condition so that the negative ring output pulse is applied to the anode of the diode *g*, being supported by the resistor $R_1$. Considering by way of example the buffer diode numbered 1 of the $S_1$ group, the negative output pulse of the No. 1 stage of the ring passes this diode and is applied to the anode of the diode *g*. It is prevented from reacting on the other ring stages and on the circuits to which they are connected by the buffer action of diodes 2, 3, 1′ which are driven into their high resistance conditions by application of the negative pulse from ring stage No. 1 to their anodes. Meantime, this potential drives the diode *g* to its high resistance condition. Because the anode of the diode *h* is connected to the incoming line 40 and so is normally at zero potential while its cathode is connected by way of the resistor $R_2$ to a point of negative potential, it is normally in its low resistance condition so that the output terminal 50—1 of the selector $S_1$ is held at zero potential. However, if at the same instant a pulse arrives on the line 40, i. e., if the No. 1 pulse position of the group contains an "on" pulse, the diode *h* is driven to its high resistance condition; and the output point 50 is effectively isolated both from the ring circuit 45 and from the incoming line 40. It therefore momentarily adopts the potential of the point to which the lower end of the resistor $R_2$ is connected and so delivers a negative output pulse. The incoming No. 1 pulse has thus in effect been "gated" into the scale-of-two counter to be described. The actions of all the other buffer diodes of the selector $S_1$ and the actions of all of the other subsequence selectors are similar. Taken together, their effect is to deliver—

(1) At the output terminal 50—1 of the selector $S_1$ a negative pulse each time an "on" pulse appears in any of the pulse positions 1, 2, 3, or 1′ of the incoming train;

(2) At the output terminal 50—2 of the selector $S_2$ a negative pulse each time an "on" pulse appears in any of the pulse positions 1, 4, 5, or 2′ of the incoming train;

(3) At the output terminal 50—3 of the selector $S_3$ a negative pulse each time an "on' pulse appears in any of the pulse positions 2, 4, 6, or 3′ of the incoming train;

(4) At the output terminal 50—4 of the selector $S_4$ a negative pulse each time an "on" pulse appears in any of the pulse positions 3, 5, 6, or 4′ of the incoming train.

Thus, the subsequence selectors have operated to select or pick off from the incoming train the several subsequences of Table I.

The several pulse subsequences selected or picked off from the incoming train in the manner described above by the several selectors $S_1$, $S_2$, $S_3$, and $S_4$ are delivered from the output terminals of these selectors to a group of scale-of-two counters $C_1$, $C_2$, $C_3$, and $C_4$. In Figure 4, which shows these features of the circuit, each of these scale-of-two counters is shown as having a single input point connected to the output terminal 50 of the corresponding subsequence selector, two output points designated E and O, respectively, and a gating and reset terminal. The selectors which have been described above are indicated in Fig. 4 merely as boxes to which the gating pulses derived from the ring circuit as described in connection with Fig. 3 are applied in any desired fashion.

Figure 5:
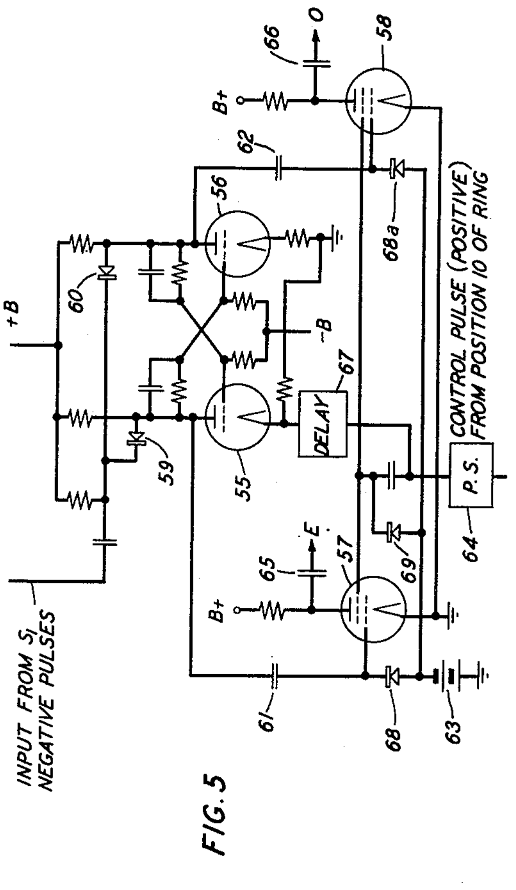
Fig. 5 is a schematic circuit diagram showing circuit details of certain components of the apparatus of Fig. 3.

Each scale-of-two counter, which by itself is a circuit element well known in the art, may comprise a bistable multivibrator of two triodes 55, 56, as indicated in Fig. 5, the outputs E and O preferably being taken from the anodes of the multivibrator tubes by way of buffer tubes 57, 58, while the input pulses from the selector circuit are applied by way of rectifiers 59, 60. As is well known, such a multivibrator adopts one or other of two stable conditions, in each of which one of the tubes 55, 56 conducts while the other is cut off. Each negative pulse applied from the subsequence selector is ineffective on the tube which is cut off but tends to drive the conducting tube into the cut-off condition. Conduction then snaps rapidly from one tube to the other. The next applied pulse, though it be identical in magnitude and polarity with the first one, reverses the condition. Thus, there is delivered to the grid of the left-hand buffer tube 57 by way of a coupling condenser 61 a voltage pulse having one value for each even-numbered input pulse and another value for each odd-numbered input pulse, while these values are reversed at the grid of the right-hand buffer tube 58. This voltage is in each case supported by the rectifier 68 or 68a in its high resistance condition. The grids are prevented from returning to an excessive negative potential by virtue of their connection by way of these rectifiers to a battery 63.

During the progress of the count, both the E output and the O output are disabled by the application of a negative bias voltage to the suppressor grids of both of the buffer tubes 57, 58 derived from the battery 63 or the like. At the conclusion of each full pulse sequence, a positive pulse derived, for example, from the tenth stage of the ring circuit and reversed in polarity by a phase inverter 64 overcomes this suppressor grid bias and permits the buffer tubes 57, 58 to become momentarily operative to pass the results of the parity subsequence pulse counts to the right-hand portion of the circuit of Fig. 4. This pulse voltage is similarly supported by the rectifier 69. When the count is even, the left-hand buffer tube 57 conducts and passes a momentary negative pulse through the coupling condenser 65. When the count is odd, the right-hand tube 58 conducts and passes a momentary negative pulse through the coupling condenser 66.

Because the total number of "on" pulses in any complete incoming code group of pulses may be odd or even because the pulse count of importance for the present purposes commences afresh with each pulse group, it is necessary to reset each of the scale-of-two counters to a standard starting condition at the conclusion of each pulse group to place it in readiness for the reception of the following pulse group. Means are well known for so resetting a scale-of-two counter. For example, the positive control pulse derived as described above for enablement of the buffer tubes may also be applied by way of a delay device 67 to the cathode of one of the tubes 55 of the multivibrator.

Because of the sequence of input pulses to each scale-of-two counter is one of the parity subsequences of Table II, the counter in effect determines whether the sum of the "on" pulses of the subsequence delivered to it is an even number or an odd number. If it is an even number, a negative pulse is delivered on the E output, while if it is an odd number, a negative pulse is delivered on the O output.

The even and odd output terminals of the several scale-of-two counters are now grouped in accordance with Table III and applied individually to the anodes of rectifier diodes 70, which are arranged in groups of four. Thus, for example, the odd outputs of the first counter $C_1$ and of the second counter $C_2$ are applied to the anodes of the upper two rectifier diodes of the first group, while the even outputs of the third counter $C_3$ and of the fourth counter $C_4$ are similarly applied to the anodes of the lower diodes of the first group. This group of diodes becomes a high resistance path when and only when the potentials applied to the anodes of all of its diodes 70 are negative. Thus, in the case of the first diode group, it becomes a high resistance path when the odd outputs of the first two counters are pulsed and the even outputs of the third and fourth counters are pulsed. Referring to Table II, this is precisely the condition which indicates an error in pulse position No. 1. Because of the binary character of the pulse train, an error can only mean that an "on" pulse exists where it should not or that it fails to exist where it should. There being only two possible signal conditions, reversal of the existing condition is tantamount to correction of the error. Therefore, when the low resistance path through the first group of diodes 70 is broken as described above, potential is applied on the first output conductor 71—1 which must be utilized to correct pulse position No. 1 of the incoming train. The correcting pulse conductor 71—1 is connected by way of a high resistance 72—1 to ground and, by way of the diode group, to the anodes of the buffer tubes 57, 58 of Fig. 5. Therefore, when the path through the diode group becomes a high resistance, the potential of the correcting pulse conductor 71 falls from approximately that of the buffer tube anode supply to a value slightly above ground. In precisely the same manner, when the high resistance path through the second diode group is broken, a potential is applied to the second output conductor 71—2 which must be utilized to correct the second pulse position of the train. The second diode group becomes a high resistance path when the outputs of the first and third counters are odd, the outputs of the second and fourth counters being even. From Table II, it is apparent that this is the condition which calls for a reversal of the value of the second pulse position of the train. So it is with each group of diodes 70 of the bank, the anodes of the several diodes of each group being appropriately connected to the odd output terminals or the even output terminals of the several counters in accordance with the requirements of Table II.

In order that the outputs derived as here described shall reverse the signalling value of the appropriate pulse position, each of the correcting pulses must be delayed with respect to its predecessor by a single pulse period. To this end, delay units of any desired type are included in the pulse correction conductors, each of them interposing a time delay which is of greater length that that of its predecessor by a single pulse period T. The first one of these, which interposes the shortest time delay, is included only for the sake of completeness. As a practical matter, it may obviously be omitted altogether, the time delays introduced by the remaining units being correspondingly reduced in length.

The correcting pulses thus produced are applied by way of a conductor 75 to a pulse corrector 76 to which the incoming pulse train is also applied by way of the conductors 40, 77. To the end that the correcting pulses may arrive at exactly the proper instants, a delay unit 78 of appropriate length and of any desired construction is interposed in the pulse train path.

Fig. 6 shows a circuit arrangement for carrying out the pulse correction process. Its input terminals and its output terminals are numbered to correspond with those of the pulse corrector box of Fig. 5.

The circuit employs two input triodes 81 and 82 and two output triodes 83 and 84. (If desired, the two tubes 81 and 82 may be the two halves of a twin tube and similarly with respect to triodes 83 and 84.) Tubes 81 and 83 are coupled through a common cathode resistor which comprises the series connected resistors 85 and 86. Similarly, tubes 82 and 84 are coupled through the common cathode resistor comprising the resistors 87 and 88. The tubes 83 and 84 are provided with a common anode resistor 89 and are coupled to the parallel connected output conductor 100.

The input terminals 75 and 77 are connected to the grids of the tubes 81 and 82 through the respective blocking condensers 91 and 92. The grids of these tubes are also connected through the germanium varistors 93 and 94 and grid biasing batteries 95 and 96 to ground. The varistors 93 and 94 act as direct-current restorers and are required because there may be a considerable variation in duty factor in the pulsed inputs.

As previously indicated, it is assumed that the circuit is operated with negative pulses for "on" pulses. Accordingly, the tubes 81 and 82 have their grids biased positively so that they are conducting in the absence of input pulses and operate as cathode followers. The two resistors making up the cathode resistor of each of these tubes are so proportioned that the larger part of the voltage drop occurs across the grounded resistor, that is, resistor 86 and resistor 88 have high resistances compared to resistors 85 and 87, respectively. For example, assuming the use of Western Electric Company 396A vacuum tubes, a plate voltage of 300 volts and a grid biasing voltage of +150 volts under the normal rest condition with no signal applied to the grids, the cathode voltage can be taken as being about 151 volts and the voltage at the junction of the cathode resistors as 145 volts. Under these conditions, the tubes 83 and 84 do not conduct, because their cathodes are at the same voltage as the cathodes of the tubes 81 and 82, and their grids are at the voltage at the junction of the cathode resistors, which is about 6 volts below that of the cathodes and below the cut-off voltage.

The operation of the circuit under the four possible input conditions will now be considered, assuming that each input pulse of the incoming train and each input pulse on the pulse correction conductor is a pulse of about 12 volts negative.

First, with an "off" pulse applied to the inputs to both tubes 81 and 82, the condition remains the same as that just described for a normal rest condition. Accordingly, there is no output from the tubes 83 and 84 which are cut off, and a spacing condition or "off" pulse appears at the output terminal 100.

Second, with "on" pulses, about 12 volts negative applied to the grids of both tubes 81 and 82. In this situation, the cathodes of the tubes 81 and 82 change from the rest condition by about the same amount as the grids, dropping by about 12 volts to a voltage of 139 volts in accordance with the cathode follower action. The cathodes of tubes 83 and 84 are carried to the same voltage. However, tubes 83 and 84 remain cut off, since the change in their grid voltages is almost as large as that in their cathode voltages. The reason for this is that, as stated in connection with the consideration of the rest condition, the voltage drop across each of the resistors 85 and 87 is small compared to that across the respective resistors 86 and 88. From another viewpoint, since there is a change of only 12 volts in the 150-volt drop across each complete cathode resistor, there is only a proportional change in the 6-volt drop across the grid biasing resistor (85 or 87) and the corresponding biasing voltage on the grids of tubes 83 and 84 remains sufficient to maintain the tubes cut off. For this second condition, there is again no output produced across the anode resistor 89 and consequently an "off" pulse condition on the output conductor 100.

Third, with an "off" pulse on tube 81 and an "on" pulse on tube 82. Under this condition, tube 81 remains in the rest condition and maintains the grid of tube 84 at 145 volts. The negative 12-volt "on" pulse applied to the grid of tube 82 causes a reduction of space current in that tube; and in the absence of interaction with other tubes, its cathode would fall by a similar amount to 139 volts. However, the cathode of tube 84 is carried along at the same voltage as cathode 82; and since the grid of tube 84 is maintained at 145 volts by tube 81, it commences to conduct as soon as the cathode voltage is reduced to a value such that the resulting grid-cathode voltage is less than the cut-off value. As a result, tube 84 acts as a cathode follower, establishing its cathode voltage at about 146 volts. In this operation, the cathode current is transferred to tube 84 from tube 82, which becomes cut off, its grid voltage being pulsed to 138 volts, which is more than the 6-volt cut-off value below the cathode voltage of 146 volts established by the action of tube 84. The plate current thus transferred to tube 84 flows through the anode resistor 89, producing at the output terminal 100 a negative "on" pulse.

The fourth case is for an "on" pulse on the grid of tube 81 and an "off" pulse on the grid of tube 82. The action in this case is the same as that just described except that the current transfer takes place between the tubes 81 and 83 instead of between the tubes 82 and 84. A negative "on" pulse is produced at the output terminal 100 by the space current of tube 83 flowing through the resistor 89.

The four conditions described above may be summarized as follows:

*Table IV*

| Pulse Train Input | Correcting Pulse Input | Output |
|---|---|---|
| Off | Off | Off |
| On | Off | On |
| Off | On | On |
| On | On | Off |

This table shows that the correcting pulse, when present, operating to reverse the incoming signal pulse, changing it from an "off" pulse to an "on" pulse, or vice versa, while when the correcting pulse is not present, the pulse of the incoming train is left unchanged.

Any single error which may have crept into the incoming pulse train has now been corrected. If the apparatus described forms a part of a repeater station, the pulse train may be retransmitted in any desired fashion. If, on the contrary, it forms a part of a receiver station, it remains only to decode the pulse trains and reproduce it. To this end, each of the successive groups of information pulses may be applied to a decoder 110 of any suitable variety, for example, the decoder which is described in the Bell System Technical Journal publication above referred to. This converts each group of information pulses into a corresponding signal amplitude sample, and these may be applied to a reproducer 111 such as a telephone instrument. The checking pulses having served their purpose should be discarded, for example, by appropriately timed gating circuits, prior to the application of the information pulses to the decoder.

Various extensions of the invention will occur to those skilled in the art. For example, by the addition of a fifth check pulse, it is possible to detect the presence of a second error, while at the same time correcting the first.

What is claimed is:

1. In a pulse code transmission system, means for generating a group of $n$ successive pulses of which $m$ are information pulses and the remainder $k(m+k=n)$ are checking pulses which comprises means for generating a cathode beam, a mask having apertures arranged in $n$ columns and $2^m$ rows disposed in the path of said beam, elements for deflecting said beam in one direction to a particular aperture row under control of a signal sample to be encoded, means for sweeping the beam over all of the apertures of the row to which it is deflected, and means for deriving current pulses from passage of the beam electrons through the several apertures of said particular row, the apertures of $m$ of said columns being arranged in accordance with a two-valued code, the apertures of the remaining $k$ columns being so arranged that the aperture disposition of each one of the $2^m$ rows differs from that of every other row, in a column-for-column comparison taken over all $n$ columns, in at least three apertures.

2. In a pulse code transmission system, means for generating a group of $n$ successive pulses of which $m$ are information pulses and the remainder $k(m+k=n)$ are checking pulses which comprises means for generating a cathode beam, a mask having apertures arranged in $n$ columns and $2^m$ rows disposed in the path of said beam, elements for deflecting said beam in one direction to a particular aperture row under control of a signal sample to be encoded, means for sweeping the beam over all of the apertures of the row to which it is deflected, and means for deriving current pulses from passage of the beam electrons through the several apertures of said particular row, the apertures of $m$ of said columns being arranged in accordance with a two-valued code, the apertures of the remaining $k$ columns being so arranged that the sequence of current pulses resulting from the sweep of the beam along any row differs in at least three pulse positions from the corresponding sequence for every other row.

3. In a pulse code transmission system, means for generating a group of $n$ successive pulses of which $m$ are information pulses and the remainder $k(m+k=n)$ are checking pulses which comprises means for generating a cathode beam, a mask having apertures arranged in $n$ columns and $2^m$ rows disposed in the path of said beam, elements for deflecting said beam in one direction to a particular aperture row under control of a signal sample to be encoded, means for sweeping the beam over all of the apertures of the row to which it is deflected, and means for deriving current pulses from passage of the beam electrons through the several apertures of said particular row, the apertures of $m$ of said columns being arranged in accordance with a two-valued code, the apertures of each one of the remaining $k$ columns being so arranged as to form, for every row, $k$ distinct like-parity subgroups of apertures, each such subgroup containing a different one of the $k$-column apertures and a different selection of the $m$-column apertures.

4. Apparatus for correcting a transmission error in an incoming sequence of $n$ "on"-or-"off" pulses of which $m$ are information pulses while the remainder $k(m+k=n)$ are check pulses, each of said check pulses being a member of a single preassigned error-check subsequence of pulses, there being $k$ of such error-check subsequences, which comprises means for receiving said incoming pulses consecutively, means, for each one of said error-check subsequences, for picking out from said incoming pulse sequence all the pulses of said one error-check subsequence, means for determining the sum of the pulses of each of said error-check subsequences, means for utilizing said sums to identify a pulse of the original sequence which has an erroneous value, means for delaying said original pulse sequence for a time equal to the time required for said determination and said identification, and means for reversing the value of said identified pulse.

5. Apparatus for correcting a transmission error in an incoming sequence of $n$ "on"-or-"off" pulses of which $m$ are information pulses while the remainder $k(m+k=n)$ are check pulses, each of said check pulses being a member of a single preassigned error-check subsequence of pulses, there being $k$ of such error-check subsequences, which comprises means for receiving said incoming pulses consecutively, means, for each one of said error-check subsequences, for picking out from said incoming pulse sequence all the pulses of said one error-check subsequence, means for determining the odd-or-even value of the sum of the pulses of each of said error-check subsequences, means for utilizing said determined values to identify a pulse of the original sequence which has an erroneous value, means for delaying said original pulse sequence for a time equal to the time required for said determination and said identification, and means for reversing the value of said identified pulse.

6. Apparatus for correcting a transmission error in an incoming sequence of $n$ "on"-or-"off" pulses of which $m$ are information pulses while the remainder $k(m+k=n)$ are check pulses, each of said check pulses being a member of a single preassigned error-check subsequence of pulses, there being $k$ of such error-check subsequences, which comprises means for receiving said incoming pulses consecutively, means, for each one of said error-check subsequences, for picking out from said incoming pulse sequence all the pulses of said one error-check subsequence, means for comparing each of said subsequences with every possible error-free subsequence to identify a pulse of the original sequence which has an erroneous value, means for delaying said original pulse sequence for a time equal to the time required for said comparisons and said identification, and means for reversing the value of said identified pulse.

WILLIAM R. BENNETT.

No references cited.